FIG. 1

United States Patent Office 2,799,620
Patented July 16, 1957

2,799,620

NEOMYCIN AND PROCESS OF PREPARATION

Selman A. Waksman, New Brunswick, and Hubert A. Lechevalier, Martinsville, N. J., assignors to Rutgers Research and Educational Foundation, New Brunswick, N. J., a nonprofit corporation of New Jersey Application June 29, 1956, Serial No. 594,987

23 Claims. (Cl. 167—65)

This invention relates to antibiotic substances and procedure for making them, and more particularly to a new and effective antibiotic substance that has now been produced by cultivation under artificial conditions of a micro-organism, further identified below, which is a species of the genus Streptomyces, i. e. one of the organisms classed as actinomycetes. The organism may also be aptly described as a strain of Streptomyces of the type of *Streptomyces fradiae*, the latter having been isolated from the soil in 1915 by Waksman (one of the present applicants) and Curtis, then designated as *Actinomyces fradii* but more recently listed in Bergey's Manual as *Streptomyces fradiae*. The present strain of organism of this nature, which at least closely resembles the one named, and which is employed for production of the new antibiotic as below described, has been deposited in the Rutgers University, Microbiology Department, Type Culture Collection, under the official number 3535 for the deposited culture, and has been deposited in the American Type Culture Collection as *Streptomyces fradiae* 3535; it may thus be conveniently and accurately identified as Streptomyces No. 3535.

Among the antibiotics now widely used, streptomycin has been particularly successful as a chemotherapeutic agent for a variety of purposes by reason of its activity against gram-negative as well as gram-positive bacteria, including the mycobacteria, and has been used effectively in the treatment and control of certain forms of human tuberculosis. There are, however, strains of some bacteria which are more or less resistant of streptomycin, the most significant manifestation of such resistance being its development, in certain cases, upon prolonged administration of the drug. That is to say, one or more resistant strains may develop or grow among the infectious organisms in such a case, which is usually a situation where the initial series of treatments has been only partially effective. It will therefore be appreciated that an especially useful antibiotic would be one having the following essential properties: (a) high activity against gram-negative bacteria and mycobacteria; (b) activity upon streptomycin-resistant strains of bacteria, especially of acid-fast bacteria; and (c) low toxicity to animals.

It has now been discovered, i. e. in accordance with the present invention, that the above-identified organisms (Streptomyces No. 3535) may be employed to produce a distinctively new and preeminently useful anti-bacterial substance which is of organic composition and which is different, in both chemical and antibiotic respects, from other substances of its general class, such as streptomycin, streptothricin, grisein, and actinomycin.

The novel antibiotic composition, which has been named "neomycin" and may be conveniently so identified herein, is distinctively characterized by its possession, in substantial measure, of the desirable properties that are enumerated above and that are indicative of extraordinary utility for the substance. More complete reference to the anti-bacterial properties will be made below, but it may be noted at the outset that this substance has not only shown activity against a number of streptomycin-resistant strains of bacteria (including mycobacteria) but has also been less favorable to the development of resistant growth under circumstances where the latter, in the presence of another antibiotic, such as streptomycin, might be expected. That is to say, among a number of organism types which include strains resistant respectively to other antibiotics, no significant difference in sensitivity to neomycin has been noted.

Referring to the drawings.

This new antibiotic, neomycin, has been produced by growing the organism, Streptomyces No. 3535, in a suitable nutrient medium under appropriate stationary or submerged aerobic (viz. shaken) conditions, and then isolating and purifying the substance, e. g. by procedure of the sort hereinbelow described, including various steps of adsorption, recovery by elution, separation from impurities, and precipitation. So prepared, neomycin is found to be a basic compound (i. e. forms salts with acids and forms a reineckate), most active at an alkaline reaction. That is, its anti-microbial activity tends to be limited in acid conditions, but appears to rise as neutrality is reached, and is definitely favored by an alkaline condition of the medium, characteristics that are advantageous in view of the generally alkaline reaction of the blood. The isolated substance, i. e. neomycin, is readily soluble in water, in dilute acid solutions (e. g. dilute HCl), in aqueous methanol and in acid- alcohol of low acid normality, such as the ethanol-hydrochloric acid or methanol-formic acid solutions heretofore used for elution of streptomycin from adsorbents. It is relatively insoluble in various organic solvents, such as ether, chloroform and acetone.

Neomycin has been found to be unusually thermostable, especially at neutral or slight acid or alkaline reaction, but also otherwise, and may thus be heated to 100° C. for substantial periods without destroying its activity. In one set of tests, separate batches of neomycin at pH 2, 7 and 10 respectively, were kept at a temperature of 100° C. for four hours, without significant loss of potency. Indeed this extraordinary heat stability of neomycin is a property of special utility and of definitive significance, differentiating the substance from chlortetracycline, penicillin and even streptomycin, and indicating the chemical distinctiveness of neomycin. It is also remarkably stable in solution, when stored for long periods of time such as a month or more. Solutions of it have been kept both at room temperature and under refrigeration, for at least three months without impairment of activity. Such further type of stability also affords a sharp distinction from substances such as penicillin and chlortetracycline, which deteriorate in solution in a matter of days, the latter of these being reported to be seriously impaired (even when refrigerated) in a few days. In the dry, i. e. crystalline or other finely divided state, neomycin can be safely kept for very long periods, practically indefinitely. It is not inactivated in the blood or in the presence of serum or other organic material, but it is inactivated by nucleic acid.

While the precise chemical structure of neomycin has not yet been determined, its novel composition seems fully demonstrated by its unique set of properties, including those mentioned above and elsewhere herein and especially including its antibiotic spectrum. Such properties are believed to be amply significant, even though the substance was not at first produced in a completely pure state, and has not been fully analyzed as to molecular structure. It appears, however, that neomycin does not give the maltol reaction as streptomycin does; nor does it give the Sakaguchi reaction for mono-substituted guanidine, its thus indicated lack of a guanidine group being a feature of distinction from various forms of streptomycin.

As stated, the antibiotic spectrum of neomycin is a specific and inherently unique characteristic, i. e. for purposes of identification relative to other antibiotic substances. Indeed it is generally recognized that such a spectrum, e. g. of bacteriostatic or like activity or inactivity toward a number of different organisms, constitutes a peculiarly effective means of characterizing and identifying materials of this class. That is to say, each antibiotic substance has a clearly determinable and defined spectrum which uniquely distinguishes it from other antibiotic materials without any necessity of numerical comparison among such substances as to their absolute activity toward any specific one or another of the many organisms against which they might be employed. Thus the spectrum of a given antibiotic consists, in effect, of points of relatively strong and weak activity (or inactivity), exhibited respectively toward various specific organisms and measured only in relation to each other; such a spectrum may be plotted or tabulated, and the configuration or shape of the resulting combination of peaks and valleys, so to speak, provides a positive identification of the substance and thus of its chemical as well as its antibiotic nature.

A typical spectrum for neomycin, to the extent of presently made tests, is set forth in detail hereinbelow, but certain features of it may be noted here. Generally speaking and relying on the determinations that have thus been effected up to the present, neomycin has a spectrum which involves activity toward the same important bacteria (including mycobacteria) to which streptomycin is effective, and inactivity toward fungi, again in the same way that streptomycin is relatively ineffective against such organisms. In consequence, neomycin is distinguished by its antibiotic spectrum from other materials (such as streptothricin, actinomycin, grisein, penicillin, clavacin) by most of the same general characteristics that distinguish streptomycin from them. The spectrum of neomycin also includes points of activity, so to speak, relative to a number of organisms that are insensitive to streptomycin; these regions of the spectrum which correspondingly afford distinction from the latter material are represented by streptomycin-resistant strains of *E. coli* and *M. tuberculosis*, and by the so-called Bodenheimer's organism.

The organism that has been employed to produce neomycin was isolated from the soil; as stated, it is one of the actinomycetes, has been identified as *Streptomyces fradiae*, and has been designated Streptomyces No. 3535. It gives a yellowish to brownish growth on synthetic and organic media, but no soluble pigment; it belongs, therefore, to the non-chromogenic group. It readily produces an aerial mycelium, especially on a synthetic medium, the mycelium being pigmented white colored to rose, sea shell pink or pink. The color of the mycelium may apparently be described as light russet-vinaceous, according to Ridgeway's nomenclature for color identification. Observations have also indicated that in the case of strain No. 3535 the sporulating hyphae are usually straight; some other neomycin-producing strains of *S. fradiae*, e. g. No. 3554 of the Rutgers collection, may produce spirals.

As indicated above, the new antibiotic substance has been produced by cultivation of the stated organism under highly artificial conditions, for example upon inoculating a suitable medium with spores of the organism or with submerged growth. In the light of experimental work with the process, it appears that considerable variation is permissible in the composition of the medium, preferably so long as suitable organic and inorganic constituents are present both to favor the growth of the organism and to stimulate production of the antibiotic. Thus it appears that best results are obtained when the culture is grown in a medium containing a suitable source of nitrogen, a carbohydrate, and inorganic or mineral elements such as provided by sodium chloride and other material as described below. A more specific enumeration of the types of components which can all be advantageously incorporated in the culture medium is as follows:

I. A peptone or protein digest; ordinary peptones, or protein digests such as casein digests seem to be satisfactory, and results have been obtained with materials such as soy bean peptone, sometimes called soya peptone. Particularly good results have been obtained with casein digests such as the material known as NZ amine. Another useful example is bacto peptone. A component of these types may advantageously be included, for example, in the proportion of 10 to 20 grams (or more, e. g. 25 grams) per liter of the medium. This component appears to be of special significance for the production of the antiobiotic, and may be generally described as peptone material.

II. Meat extract, or a similar type of material such as yeast extract or distiller's soluble, included in an amount, say, of 3 to 5 grams per liter or more, e. g. to 20 grams per liter. Although it is believed that this ingredient is of relatively less importance and may indeed be dispensed with in some cases, it appears to contribute materially to the desired results. This component may be described as extractive-type nutrient material, or alternatively as vitamin-containing material.

III. Carbohydrate material, preferably represented by glucose or a similar sugar such as maltose. Glucose or the like may be used in an amount, for instance, of 5 to 10 grams per liter and appears to be primarily helpful for good growth of the organism, although not, in a direct or strict sense, critically essential for production of neomycin. Indeed glucose can be omitted entirely in many media for neomycin production.

IV. Certain mineral elements, especially when such are found lacking in the water used to make up the medium or broth. An element that seems particularly important is zinc in the form of a zinc salt, such as zinc sulfate, included in relatively small amount, e. g. 10 parts per million or thereabouts. It also appears that sodium chloride is an extremely desirable component, say in the proportion of about 5 grams per liter.

V. Water, usually in the form of ordinary tap water. While distilled water may be used, e. g. by supplementing it with a zinc salt as indicated above, tap water which naturally contains a trace of combined zinc has been found entirely suitable and avoids any need for addition of mineral components other than a salt such as sodium chloride.

Using a medium of the sort just described and containing all five (5) of the listed ingredients, the pH is preferably adjusted with NaOH to about 7 or 7.2. While it is possible to begin with an acid medium, e. g. having a pH as low as 6, experience indicates that the production of the antibiotic is then materially delayed, and indeed an increase of acidity may ensue. In fact it appears that glucose or the like tends to produce or favor an increase of acidity and a consequent delay in production of neomycin. This effect of glucose has been overcome by employing peptone or casein hydrolysate in relatively substantial amount, i. e. toward the upper end of the range of proportions indicated above. Diminution of the unfavorable effects of glucose in the production of the antibiotic may also be achieved, at least in part, by decreasing the amount of the glucose (preferably while increasing the proportion of peptone as just explained) or by specifically adding a neutralizing agent such as calcium carbonate. For the latter purpose calcium carbonate has the further advantage of being self-neutralizing; while other substances such as sodium carbonate might be employed, it then becomes necessary to make daily or other regular additions of such agent, in order to maintain conditions favoring the production of the antibiotic. Alternatively, glucose can be omitted entirely, provided that the protein hydrolysate is increased, as above.

Using media of the foregoing or equivalent character, neomycin can be produced with either stationary or shaken cultures. In the case of stationary cultures, present indication is that a satisfactory yield of the antibiotic requires incubation at room temperature, e. g. within a range of 22° to 28° C. (preferably 25° to 28° C.), for a period of 7 to 12 days. For stationary cultures, the medium should be very shallow; even then, the spores of this organism tend to drop, i. e. to become submerged, and thus to fail in production of the antibiotic. It appears that this organism is characterized by a heaviness or greater specific gravity than organisms such as *Streptomyces griseus*, with which less difficulty is experienced in the incubation of stationary cultures. Preferred results are obtainable by somewhat thickening the medium, as by incorporating ¼ to ½ % of agar to afford a semi-solid or semi-liquid constituency. With such modification of the medium, the organism appears to have a suitable support so that the culture grows on the surface as a pellicle, receiving the necessary quantity of air for elaboration of the antibiotic substance.

Considerably more rapid incubation, for satisfactory yield of neomycin, has been achieved with shaken cultures, i. e. relatively deep bodies of the culture medium to which suitable agitation is imparted for effective aeration. Thus 3 to 5 days at a temperature of about 25° C. have been found sufficient for useful production, the preferred temperature range being 25° to 28° C. It appears that for optimum results the extent of agitation, or more strictly the extent of aeration, should be rather carefully controlled. It is, of course, extremely important that considerable air be caused to permeate the medium, e. g. during the shaking operation; while it is difficult to define quantitatively the amount of air or aeration necessary, the control of the latter to the desired point in actual practice is a very easy matter, involving at the most a few simple tests. While the times of incubation stated above are those heretofore found optimum in the experimental practice of the invention, it is understood that other times may be used or required in special cases. For instance, experience in the art of antibiotic production has generally indicated that the incubation period may be materially reduced by using a relatively large inoculum.

While various procedures may be adopted for separating the antibiotic material from the culture broth and for subsequently purifying it, preliminary account may be given of certain operations found especially convenient. Generally stated, the procedure involves steps of adsorption and elution, including supplemental purification steps, and extending, if desired, to chromatographic separation. By way of general example of the process, the culture medium, after the desired period of incubation, may be filtered and the filtrate treated with a suitable adsorbent such as activated charcoal or other active carbon, which adsorbs the neomycin. Upon separation of the adsorbate, i. e. the carbon, it can be treated with ethanol having a hydrochloric acid content of 2% (for example, 72% ethanol and the balance water, with HCl amounting to 2% of the total) to elute the antibiotic, or by other acid alcohol such as methanol-formic acid, for like purpose. Subsequent purification steps may include further adsorption and elution of the antibiotic, followed ultimately by precipitation with an organic liquid such as acetone and final washing and drying of the precipitate at appropriately moderate temperature.

Alternatively, the first adsorption of the neomycin may be effected with an adsorbent of the cation-exchange type. In such case (as likewise when carbon is used to adsorb neomycin) there may be a preliminary treatment of the culture medium after filtration, by strongly acidifying it and introducing activated carbon to adsorb impurities, it being understood that neomycin is not adsorbed under strongly acid conditions. For use of the cation-exchange type of adsorbent (or similarly when the carbon type of adsorbent is employed after the preliminary cleaning) the pH of the filtrate resulting from separation of the impurity-adsorbent should first be brought to an approximately neutral value. The antibiotic is then adsorbed by treatment with the stated adsorbent, and the latter, i. e. a neomycin-containing adsorbate is filtered and subjected to elution for separation of the antibiotic. Examples of cation-exchange adsorbents are zeolites, such as Decalso (a sodium aluminum silicate) and ion exchange resins, e. g. of sulfonic acid type and especially those of the carboxylic acid type, an especially useful instance of the latter being the product known as Amberlite IRC-50, which is stated to be a copolymer as disclosed in Patent No. 2,340,111, issued January 25, 1944, it being further understood that any of the specific examples of copolymers therein described would be suitable. In the case of a cation-exchange type of adsorbent, such elution may be effected with ammonium chloride solution or with dilute HCl. The resulting liquid in which the antibiotic is dissolved may thereafter be subjected to successive adsorption and elution operations, terminating with appropriate procedure for precipitation and physical separation and drying of the desired, active material, i. e. neomycin.

A more generic description of adsorbent materials useful for separation of neomycin is material selected from the class consisting of active carbon and cation-exchange adsorbents; as indicated above, however, the cation-exchange materials have exhibited unusual effectiveness.

Neomycin, e. g. produced by methods of this kind, has been found to possess a remarkably wide antibiotic spectrum, showing extremely useful activity against both gram-positive and gram-negative bacteria, and including significant activity against mycobacteria, both of the streptomycin-sensitive and the streptomycin-resistant types. Furthermore, in tests of a sort which have shown contrary results with streptomycin, there has been lesser development of resistance to neomycin among the tested organisms, such results tending to indicate the limited number of strains of such organisms which might be specifically resistant to neomycin as distinguished from streptomycin, for example.

The following table represents an antibiotic spectrum of neomycin, compared to those of streptomycin and streptothricin, the determinations for neomycin being made by the agar-streak method (i. e. an agar plate dilution method) with the isolated antibiotic material such as prepared in accordance with the procedure of the specific example set forth below. Specific values of activity in this table should of course be read with the understanding that the determinations may be improved or otherwise affected in degree upon further purification of the antibiotic, and especially with the understanding that different strains of the various test organisms may result in some differences in strength of activity. However, it is believed that the over-all nature or configuration of the spectrum is not specifically affected by such variations. For general purposes of identification of the antibiotic by the shape of its spectrum, it will likewise be understood that no particular meaning need be attached to a comparison of the absolute activities of neomycin on the one hand, and streptomycin or streptothricin on the other hand, i. e. for any given organism against which neomycin and one or both of the others are substantially active. The chief significance of the spectrum is to exhibit the over-all relationship, for each substance, of the various activities and inactivities. It may be noted, however, that according to present experience, neomycin is a highly active or potent substance, permitting economy in the amount required, and facilitating actual administration, when it may be used for control of various infections.

TABLE I

*Antibiotic spectrum of crude neomycin, as compared to that of crude streptomycin and streptothricin*

[Expressed in dilution units per gram of crude preparation required to inhibit growth of test organisms]

| Organism | Neomycin ×1,000 | Streptomycin ×1,000 | Streptothricin ×1,000 |
|---|---|---|---|
| 1. Bacillus subtilis | 150–750 | 125 | 125 |
| 2. Bacillus mycoides | 20–150 | 20 | <0.8 |
| 3. Bacillus cereus | 20–60 | 30 | <0.8 |
| 4. Staphylococcus aureus | 100–250 | 15 | 50 |
| 5. Sarcina lutea | 10 | 100 | 37.5 |
| 6. Escherichia coli SS | 25 | 25 | 25 |
| 7. Escherichia coli RS | 20 | 0 | Active |
| 8. Pseudomonas aeruginosa | 2.5 | 1 | <0.8 |
| 9. Proteus vulgaris | 25 | 10 | 12.5 |
| 10. Bodenheimer's organism | 15 | 0 | Active |
| 11. Serratia marcescens | 20 | 25 | 1.2 |
| 12. Mycobacterium tuberculosis hominis 607 (SS) | 80–250 | Active | Active |
| 13. Mycobacterium tuberculosis hominis 607 (RS) | 50–150 | Inactive | Active |
| 14. Mycobacterium avium | 50–150 | Active | Active |
| 15. Mycobacterium ranae | 150 | Active | Active |
| 16. Mycobacterium phlei | 300 | 100 | 12.5 |
| 17. Trichophyton metagrophytes | <0.3 | <0.3 | Active |
| 18. Cryptococcus albicans | <0.3 | <0.3 | Active |
| 19. Penicillium notatum | <0.3 | <0.3 | Active |

In the above table and elsewhere herein, the symbol SS means a streptomycin-sensitive strain and RS, a streptomycin-resistant strain. It will be understood that the reference to dilution units (which are the figures listed in the table, multiplied by 1000 in each instance) expresses the number of times that the given preparation of the given antibiotic may be diluted and still inhibit growth of the organism under test. Thus in the table high values represent strong activity, while the very lowest values represent relative inactivity. For convenience and brevity, the several organisms in the table may be identified by the numbers arbitrarily assigned to them in the left-hand column. A standard unit of activity is that amount of material which will inhibit the growth of a selected standard organism under selected standard conditions, in one milliliter of medium.

As shown, neomycin is fully active against all of organisms numbered 1 to 16 inclusive in the table, including activity against Nos. 1 to 6 inclusive, 8, 9, 11, 12 and 14 to 16 inclusive, against which streptomycin is similarly effective, and in contrast with streptothricin which exhibits relatively small or no activity against organisms 2, 3, 8 and 11. On the other hand, while streptothricin is active against various fungi, e. g. organisms 17, 18 and 19 of the table, neomycin is relatively inactive. It may be noted in passing that whereas the numerical values in the table represent determinations made on a basis warranting numerical comparison, some of the activities, e. g. of streptomycin and streptothricin, were determined by tests of different grades of the substance or under other circumstances, and for the results of such other tests, the characteristics are simply reported as "active" or "inactive." It is believed that the characteristics of activity and inactivity thus reported are amply significant for purposes of comparison and spectral designation in the table.

An especially significant feature of the spectrum of neomycin, distinguishing it from streptomycin, is its activity relative to organisms 7, 10 and 13, i. e. of the same character of activity as toward many other organisms in the table, and in comparison with the relative inactivity of neomycin toward organisms 17, 18 and 19. Bodenheimer's organism, Number 10 in the table, has been employed in assaying antibiotic substances, specifically to determine streptothricin in the presence of streptomycin, the latter exhibiting relatively no activity toward this organism. Sensitivity of organisms 7 and 13 toward neomycin is of special utility, i. e. representing the capability of neomycin to control these streptomycin-resistant strains of bacteria. As will be appreciated, organisms 12 and 13 are among those responsible for tuberculosis in human beings, it being thus apparent that neomycin has a field of effectiveness, e. g. against resistant strains, to which streptomycin does not extend.

The antagonism of neomycin toward strains of organisms against which streptomycin is ineffective has been demonstrated in other tests beyond those summarized in Table I. Thus for example, when plates containing different concentrations of neomycin were streaked with streptomycin-sensitive, streptomycin-resistant and streptomycin-dependent strains of E. coli, the first two were found to be sensitive alike to neomycin while the last exhibited no growth at all. Upon conducting the same test with streptomycin, only the first strain of organism showed sensitivity to the antibiotic effect, the second organism being essentially unaffected and the third yielding the growth for which it requires (according to previous discovery) the presence of streptomycin. These tests are clearly significant of difference in the biological and chemical nature of neomycin, from streptomycin.

When broth or agar cultures of various bacteria containing sufficient neomycin to inhibit growth were incubated for relatively long periods of time, no further development of the bacteria occurred; thus the stability of the antibiotic was further demonstrated, in contrast to other substances such as chlortetracycline.

For additional evidence of the action of neomycin on mycobacteria, determinations were made of the sensitivity of various streptomycin-sensitive and streptomycin-resistant strains of these organisms by the use of turbidimetric procedures in the Dubos Tween medium. The following table summarizes the results of such tests with a number of organisms or strains of organisms of this type, including the human pathogenic culture of *M. tuberculosis* H37Rv.

TABLE II

*Effect of neomycin upon the growth of different strains of M. tuberculosis in Dubos medium*

[Incubation at 37° C. for 14 days]

| Test Organism | Growth inhibition units/ml. |
|---|---|
| *M. avium* (SS) | 4.0 |
| *M. avium* R (RS) | 4.0 |
| *M. tuberculosis* H37Rv (SS) | 0.2 |
| *M. tuberculosis* H37RvR (RS) | 0.2 |
| *M. tuberculosis* H37Rv (SS) | 0.5–1.0 |
| *M. tuberculosis* H37RvR (RS) | 1.0 |
| *M. tuberculosis* 607 (SS) | 0.1 |
| *M. tuberculosis* 607R (RS) | 0.25 |

It was found that neomycin was active against all of the listed types of organisms, and as shown in the table, in each instance the streptomycin-resistant and streptomycin-sensitive strains were in effect equally sensitive to neomycin.

The fact that neomycin does not appear to favor the ready development of resistant cultures, i. e. strains of organism which are peculiarly resistant to neomycin, has been indicated by reliable tests. In one such set of tests a twenty-hour-old agar culture of *E. coli* was suspended in water and plated out in nutrient agar containing various amounts of neomycin. After 9 days incubation at 28° C., only one colony of a yeast, but not of the bacteria, developed out of 22 billion cells on a plate containing 25 u./ml. (units of activity per milliliter) of neomycin and only two colonies, likewise of yeasts and not bacteria, on a plate carrying 5 u./ml. of neomycin, no colonies at all being noted on a third plate carrying 10 u./ml. Thus it was evident that no resistant culture had been developed in any case. It was found later, however that a few colonies will develop in the presence of two to four units of neomycin, but much fewer (namely one-tenth to 1/100) than in the presence of similar concentrations of streptomycin. When pieces of agar were removed from these plates and inoculated into sterile agar plates, only some of the pieces from the plate that had carried 5 u./ml. neomycin exhibited growth; the pieces from the plates that had contained 10 u./ml. and 25 u./ml. of neomycin yielded no growth at all. These, as well as other tests, reveal that neomycin is highly bactericidal as well as bacteriostatic.

Another and extremely important property of neomycin is that it appears to be relatively non-toxic, or to have extremely low toxicity. Tests on animals and similar tests (e. g. on egg embryos) have not only afforded confirmation, in such tests, of the relatively strong activity of neomycin against various bacteria, but have also indicated that the toxicity, if any, of the antibiotic to animals is at most very limited. In these tests the activity against bacteria has been shown with respect to both gram-positive and gram-negative organisms and against both streptomycin-sensitive and streptomycin-resistant organisms, examples being streptomycin-sensitive strains of *Staphylococcus aureus, Klebsiella pneumoniae,* and *Shigella pullorum* and streptomycin-resistant strains of *Salmonella schottmülleri* and *Staphylococcus aureus.* The tests revealed an effective capacity of neomycin to control each of these organisms. With respect to toxicity, the tests on animals, e. g. mice, indicated that no appreciably toxic or other adverse effects occured even though the treatment was increased to from 20 to 80 times the effective dose.

From what has been said hereinabove, it will be appreciated that the culture medium employed for production of the antibiotic may vary considerably, dependent on conditions, nutrient substances available and the like. Simply by way of example, the following are instances of media which have been employed for the cultivation of *Streptomyces fradiae* (No. 3535) and production of neomycin thereby:

CULTURE MEDIUM—EXAMPLE 1

| | | |
|---|---|---|
| Soy bean peptone | g | 20 |
| Meat extract | g | 5 |
| Glucose | g | 5–10 |
| Sodium chloride | g | 5 |

One liter of tap water (as described above).

CULTURE MEDIUM—EXAMPLE 2

| | | |
|---|---|---|
| Soy bean peptone | g | 10 |
| Meat extract | g | 5 |
| Glucose | g | 10 |
| Calcium carbonate (fine powder) | g | 10 |
| Sodium chloride | g | 5 |

One liter of tap water (as described above).

CULTURE MEDIUM—EXAMPLE 3

| | | |
|---|---|---|
| Casein hydrolysate (NZ-amine) | g | 25 |
| Beef extract | g | 10 |

One liter of tap water (as described above).

CULTURE MEDIUM—EXAMPLE 4

| | | |
|---|---|---|
| Casein hydrolysate (NZ-amine) | g | 25 |
| Distiller's soluble | g | 20 |

One liter of tap water (as described above).

As explained above, the medium of Example 2, which has a relatively low peptone content and a relatively high glucose content, also includes a quantity of calcium carbonate to prevent possible undesirable effects of increased acidity during incubation. While each of the above media has been usefully employed, Examples 3 and 4 have been found to yield very superior results. In each case, shaken cultures were used. In each instance, the pH is adjusted to approximately 7 before inoculation with spores or submerged growth of the organism S. No. 3535.

Figure 1:
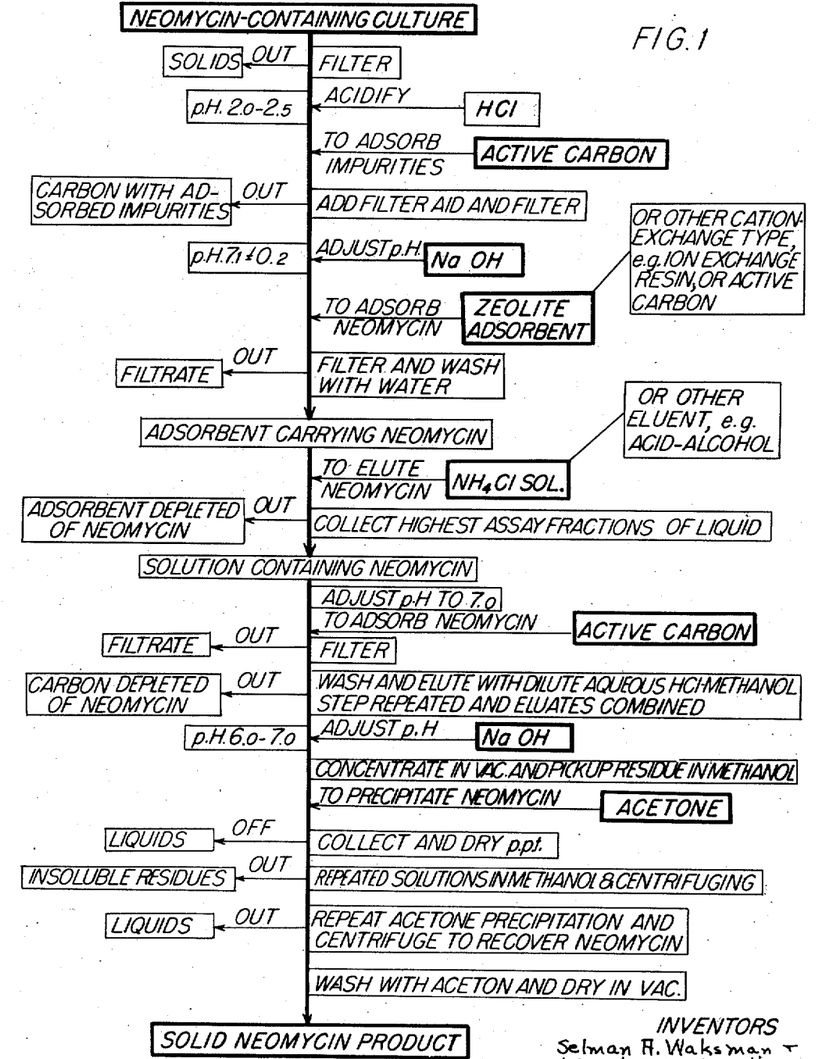
Fig. 1 is a flow sheet of a suitable process for extracting neomycin from a culture in which it is produced.

By way of further and more specific example of a set of operations for separating and partially purifying neomycin, the following procedure is set forth, as shown in Fig. 1. After preliminary filtration to remove suspended solids, the culture medium or broth was acidified with concentrated hydrochloric acid, reducing its pH to a value of 2.0 to 2.5. Activated charcoal, specifically the kind identified as Darco G–60, was added in an amount of 5 grams per liter and the mixture stirred for about 30 minutes. Thereafter a suitable filter-aid, for example a material of the nature of diatomaceous earth, specifically a filtration-assisting material known as Hyflo Super-Cel, was stirred into the mixture, in the amount of 5 grams per liter, and the mixture was then filtered through a pad of the same material, e. g. Hyflo Super-Cel, in like amount. Since neomycin is not found to be adsorbed at strongly acid reaction, the result of this treatment with charcoal and subsequent filtration provided a preliminary removal of certain impurities, it being understood that an expedited process may in some cases omit this preliminary treatment.

The filtrate from the treatment just described thus constitutes a preliminary purified filtrate of culture broth and contains the desired neomycin. The pH of this solution was then adjusted to 7.1±0.2 with 40% sodium hydroxide solution. An adsorbent material, specifically of the zeolite type (sodium-aluminum silicate) was then introduced, a suitable substance being the product known as Decalso. The amount of this adsorbent may vary, effective results having been had where it was introduced in a proportion of 1 gram for each 7000 activity units of neomycin in the solution. The mixture was then stirred for about 30 minutes and the adsorbate, i. e. the adsorbent-containing neomycin, was filtered off, washed with water and permitted to dry in air overnight.

The dried Decalso adsorbate was then placed in a column having an inside diameter of 30 mm. and fitted with a glass wool plug. A 10% aqueous ammonium chloride solution was percolated through the adsorbate (viz. the zeolite material containing the adsorbed neomycin) and successive fractions were collected for assay. Thus the neomycin was effectively eluted from the adsorbent. The assay of the several fractions can be effected either by the streak method using *E. coli,* or by the agar cup method, then conveniently using *B. subtilis.* The fractions having the highest potencies were combined to make a single body of solution and the pH of the mixture was adjusted to 7.0 A further quantity of activated charcoal, e. g. Darco G-60 in amount of 10 grams per 100 ml. was added and the mixture was stirred for 30 minutes. The adsorbate, viz. the charcoal-containing neomycin, was filtered off, washed with water and dried with air. The antibiotic was eluted from this adsorbate by stirring the latter for 30 minutes with 0.05 N hydrochloric acid in 50% methanol, using 5 ml. of the dilute acid alcohol per gram of the charcoal. The eluted charcoal was filtered off and subjected to a second elution in the same manner. The eluates were combined, the pH of the combination being then adjusted to 6.0–7.0 with aqueous sodium hydroxide. Such solution, containing the neomycin, was thereupon concentrated in vacuo to a volume of about 3 ml.

The described small residue of liquid, containing the antibiotic, was picked up in methanol; the resulting mixture was treated with 8 to 10 volumes of acetone to precipitate the neomycin. The precipitate was collected and dried. It was then treated with about 10 ml. of methanol and centrifuged to remove insoluble material. This material was again treated with 10–15 ml. of methanol. Again the insoluble residue was centrifuged off. The neomycin-containing solutions, viz. the supernatant liquids at the end of each centrifuging operation, were then treated with 8 to 10 volumes of acetone to precipitate the neomycin. The resulting suspensions were permitted to stand a few hours at 5° C., whereupon they were again centrifuged. The separated solid materials this time constituting the neomycin, were finally washed with acetone and dried in vacuo, to yield dry, rather finely divided products, constituting isolated and separated, though still somewhat crude bodies of the new antibiotic substance, neomycin. As indicated above, further purification steps may be followed, leading to a product of high purity corresponding to the quality of certain other antibiotics now commercially available. However, the product resulting from the procedure specifically described has been found to possess the new and desirable properties herein set forth, both antibiotically and otherwise.

For reference purposes herein, a unit of neomycin is the minimum amount of such substance that will completely inhibit the growth of a selected standard strain of *Escherichia coli,* namely *E. coli* A. T. C. C. 9637, in one ml. of nutrient agar.

By way of further example of the spectrum of neomycin, the following Table III presents a somewhat expanded or more elaborate comparison of the antibiotic spectra of neomycin and streptomycin, it being understood that the explanatory or qualifying remarks preceding Table I hereinabove apply equally here. In the case of Table III the values for neomycin were found with the somewhat crude complex, obtained as described above. In this table the quantities set forth are the amounts of the antibiotic required to inhibit growth of the respective organisms, in 1 ml. of culture, the neomycin values being given in units per ml. and the streptomycin values in micrograms (of pure streptomycin) per ml. Thus unlike Table I (wherein high numbers represented strong activity), Table III is directly expressed in quantities of antibiotic substance, so that low numerical values indicate strong activity of the substance, while very high values mean relative inactivity.

TABLE III

*Comparative antibiotic spectra of neomycin and streptomycin*

[Expressed in amounts required to inhibit growth of organism.]

| Organism | Neomycin (units/ml.) | Streptomycin (micrograms/ml.) |
|---|---|---|
| Aerobacter aerogenes | 0.625 | 0.5–2.5 |
| Bacillus anthracis | 0.156 | 0.375 |
| B. mycoides | 0.1–0.5 | 0.1–3.8 |
| B. subtilis | 0.02–0.1 | 0.12–1.0 |
| Brucella abortus | 1.25–5.0 | 0.5–3.75 |
| B. melitensis | 0.625–2.5 | 0.5 |
| B. suis | 0.312–2.5 | 0.5 |
| Clostridium perfringens | >10.0 | >104 |
| Corynebacterium diphtheriae | 0.156 | 0.375–3.75 |
| Escherichia coli | 1.25–2.5 | 0.3–3.75 |
| E. coli RS | 1.5–5.0 | >1,000 |
| Hemophilus influenzae | 1.25–2.5 | 1.56–5.0 |
| H. pertussis | 2.5 | 1.25–3.0 |
| Klebsiella pneumoniae | 0.312–0.625 | 0.625–8.0 |
| K. pneumoniae RS | 0.312 | >1,000 |
| Malleomyces mallei | >10.0 | 10–>10.0 |
| Mycobacterium avium | 0.1–0.3 | 10 |
| M. phlei | 0.05–0.078 | 0.12 |
| M. tuberculosis | <0.5 | 1.0–5.0 |
| M. tuberculosis RS | <0.5 | >100 |
| Neisseria intracellularis | 1.25–2.5 | 5.0 |
| Pasteurella pestis | 0.625 | 0.75–1.5 |
| P. tularensis | 0.156 | 0.15–0.3 |
| Phytomonas pruni | 0.1 | 0.25 |
| Proteus vulgaris | 1.25–2.5 | 0.4–3.0 |
| Pseudomonas aeruginosa | 12.5–25.0 | 2.5–25.0 |
| Salmonella typhosa | 0.1–0.625 | 1.0–37.5 |
| S. schottmülleri | 0.4–0.7 | 2.0 |
| Sarcina lutea | 2.5 | 0.25 |
| Serratia marcescens | 1.25 | 1.0 |
| Shigella paradysenteriae | 0.25–0.5 | 0.25–3.75 |
| Staphylococcus aureus | 0.156–0.625 | 0.5–>16.0 |
| Streptococcus faecalis | 5.0 | 50.0 |
| Vibrio comma | 2.5 | 6.0–37.5 |
| Various fungi | >10.0 | >10.0 |

A further inherent feature of the antimicrobial properties of neomycin is that it is inactive against Rickettsiae, such as Rocky Mountain spotted fever (*Rickettsia rickettsii*). Additional properties of neomycin, likewise inherently characteristic of the substance, are that it gives a negative response to test by the biuret reaction, that it is not inactivated by hydroxylamine or cysteine, and that its potency is not affected by sodium chloride, for example even when sodium chloride is present to the amount of 20% in solutions of neomycin used for antibacterial test. Neomycin gives positive Molisch and carbazole tests for carbohydrate residues and a negative Elson-Morgan test for glucosamine. It gives a positive ninhydrin test, and shows no acidic or carbonyl groups. It does not reduce Fehling's or Tollens' reagents. It contains no methoxyl groups.

Counter-current distributions of neomycin in a number of solvent systems and at various values of pH, have been made, using a hydrochloride of neomycin (prepared as described hereinabove) and employing the so-called Craig 24-plate counter-current distribution machine (see Craig, in J. Biol. Chem., vol. 155, page 519, for 1944). The distributions were effected between a buffered aqueous phase and pentasol, using stearic acid as carrier. Three systems that were employed respectively involved borate buffer at pH 7.3, 7.6 and 7.8, the procedure being as described by E. A. Swart (The use of counter-current distribution for the characterization of Streptomyces antibiotics, in Journal of the American Chemical Society, vol. 71, page 2942). Like distribution in the system of Plaut and McCormack (Journal Amer. Chem. Soc., vol. 71, page 2264, 1944) was also effected, i. e. between sodium bicarbonate buffer and pentasol, again using stearic acid as carrier. To provide reference points, streptomycin and streptothricin were distributed in the four systems, it being noted that the results with respect to principal, significant peaks in the distribution curves were the same for the three substances (neomycin, streptomycin and streptothricin) whethr distributed in a mixture or separately. As will be understood, the distribution in each case involved 24 transfers.

The distribution curves were plotted from suitable bioassays of the contents of the 24 tubes in the machine; in every case it was found that each substance was represented by a single, major peak. The following summarizes the results obtained, it being noted that the stated bicarbonate-buffer system is inherently buffered at pH of approximately 7.6, which therefore need not be specified:

TABLE IV

| Buffer | Location (Tube Number) of Peak | | |
|---|---|---|---|
| | Neomycin | Streptomycin | Streptothricin |
| Borate at pH 7.3 | 14 | 3 | 2 |
| Borate at pH 7.6 | 21 | 9 | 8 |
| Borate at pH 7.8 | 22 | 16 | 14 |
| Bicarbonate | 15 | 21 | 8 |

The noted pattern of peaks for neomycin is distinctive and reproducible, and is understood to represent an inherent characteristic of such substance. A careful repetition of these distribution tests has also been made, with precisely the same solvent systems and the same distribution procedure. The peak concentrations of the several antibiotics (each being distributed separately in each of the solvent systems) were determined both by bio-assays and chemical assays. A standard cup-assay method was used for the biological assays. For the chemical analysis of neomycin and streptothricin distributions the ninhydrin reaction was employed, while the Sakaguchi method was used for the streptomycin distributions. The biological and chemical analyses were found to agree with each other perfectly. The distributions at pH 7.3 were made at temperatures (C.) of about 28° (neomycin), 35° (streptomycin) and 31° (streptothricin); those for pH 7.6 at about 29°; and the remainder at about 24° to 26°, except that the temperature of the streptothricin distribution at pH 7.8 was about 20°. The results of these twelve distributions of the three substances (each as hydrochloride) are shown by the following tabulation in the manner of Table IV:

TABLE V

| Buffer | Location (Tube Number) of Peak | | |
|---|---|---|---|
| | Neomycin | Streptomycin | Streptothricin |
| Borate at pH 7.3 | 13 | 6 | 3 |
| Borate at pH 7.6 | 21 | 10 | 11 |
| Borate at pH 7.8 | 22 | 18 | 14 |
| Bicarbonate | 14 | 21 | 9 |

As will be noted, Table V is in good agreement with Table IV, wherefore the approximate pattern of either table, especially as to the peak locations of neomycin and their general relation to the peak locations for the other antibiotics in the same systems, may be taken as a significant characteristic of neomycin. Minor variations of peak locations occurred, as are to be expected in scientific experiments.

As will be apparent from description hereinabove, neomycin can be produced in the free base form, and also as acid salts, of which specific examples already noted or indicated are the hydrochloride, formate and picrate. Another such readily produced salt is the sulfate.

Neomycin has been found to contain, e. g. in its free base form, the following approximate proportions of the following elements, carbon 44.95%, hydrogen 7.55%, nitrogen 14.46%, oxygen 33.04%. This analysis indicates the following empirical formula:

$$C_{29}H_{58}N_8O_{16}$$

It will be understood that the acid salts, such as mentioned above, are formed in a conventional manner.

Studies have indicated that neomycin as produced by the specific procedures defined above usually consists very predominantly of a single specific compound which has been designated neomycin B. It has also been indicated that neomycin appears in what is understood to be an isomeric form, which has been called neomycin C. Each of the isomers is understood to have all of the chemical, physical and biological properties described hereinabove, including the stated empirical formula, the formation of acid salts as explained, and the significant antibiotic characteristics that have been pointed out. Methanolysis of neomycin hydrochloride has been found to yield two fragments. The first fragment is an amorphous hydrochloride which is devoid of reducing power, which yields all its nitrogen as amino nitrogen and which is understood to have the empirical formula:

$$C_{12}H_{24}N_4O_6 \cdot 4HCl$$

This substance is called neamine and has also been called neomycin A, although it is not true neomycin but is a degradation product which exhibits relatively little antibiotic activity, by dilution tests, against gram-negative organisms (examples of such organisms being S. marcescens, Bodenheimer's organism, E. coli and A. aerogenes), i. e. in comparison with the activity of true neomycin toward gram-negative bacteria and also in comparison with the activity of neamine against gram-positive organisms.

The other fragment of methanolysis of neomycin is a compound called methyl neobiosaminide which upon acid hydrolysis yields a reducing diamine having (as at present understood) the empirical formula:

$$C_6H_{14}N_2O_3 \cdot 2HCl$$

The remainder of the methyl neobiosaminide is a pentose as shown by the production of furfural on acid hydrolysis. The methyl neobiosaminide produced by methanolysis of neomycin C is an isomer of the same compound produced from neomycin B and the resulting diamines are similarly isomers of each other. As indicated, neomycin produced by the specific procedures outlined above is usually found to consist very largely of neomycin B, accompanied in most cases by a small proportion of neomycin C. Neamine is distinguished from true neomycin in a number of ways, e. g. as indicated above, and also in that upon counter-current distribution in the borate-buffer-pentasol-stearic acid system at pH 7.6, it exhibits a peak at about tube 15 (24 transfers) whereas true neomycin appears at about tube 21.

The optical rotation, $[\alpha]^D_{25}$, of neomycin B hydrochloride is +54°, neomycin B sulfate +58°, and neomycin C hydrochloride +80° (all rotation measurements taken in water, c.=0.5%).

Figure 2:
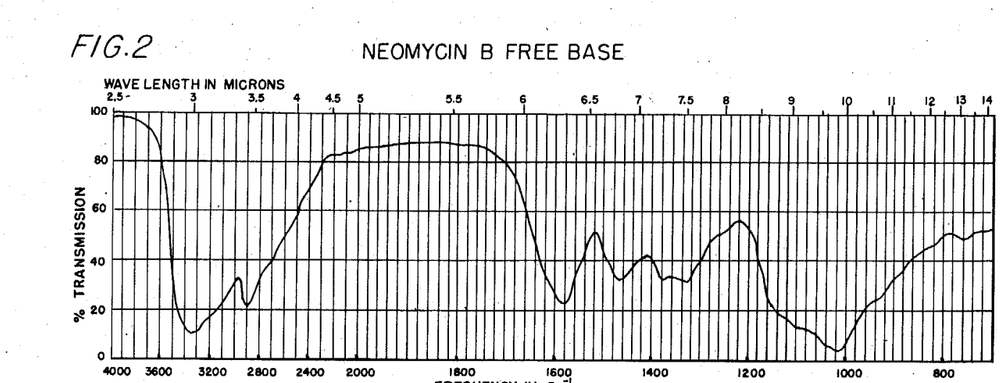
Fig. 2 is a curve of the infra-red spectrum of neomycin in the free base form, and specifically in the form of neomycin B, free base.
Figure 3:
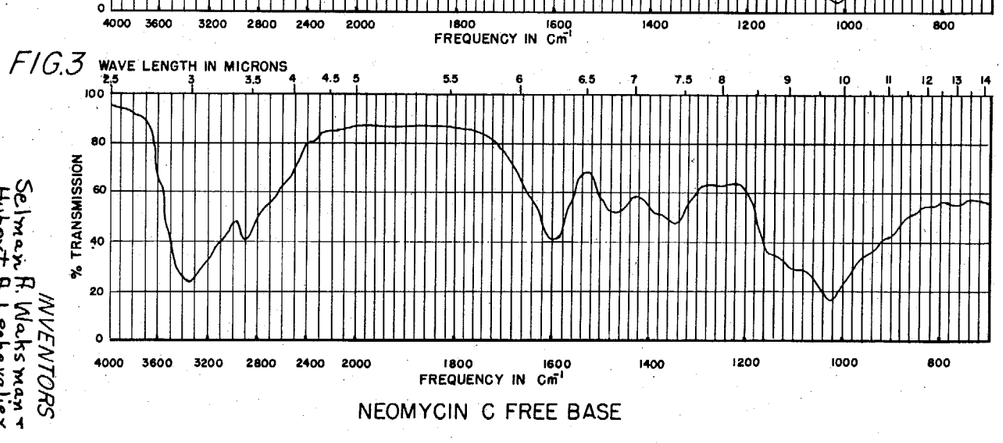
Fig. 3 is a curve of the infra-red spectrum of neomycin in the free base form, and specifically in the form of neomycin C, free base.
Figure 4:
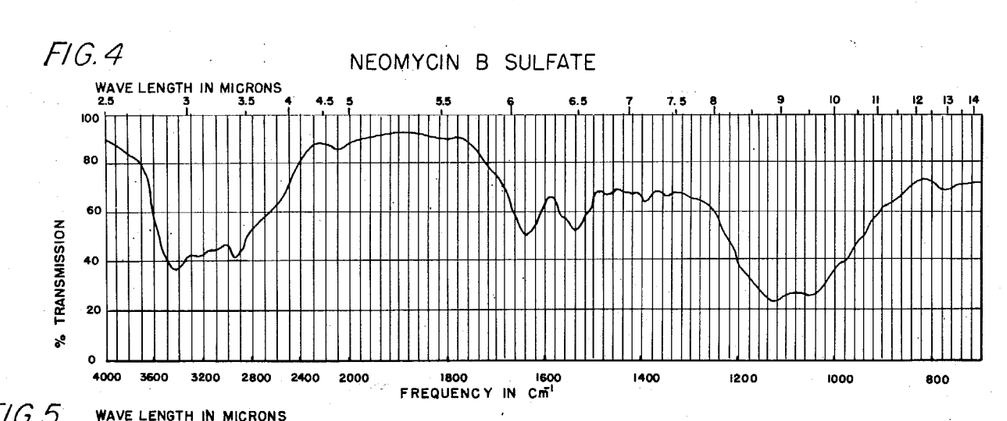
Fig. 4 is a curve of the infra-red spectrum of the sulfate of neomycin, specifically in the form of neomycin B sulfate.
Figure 5:
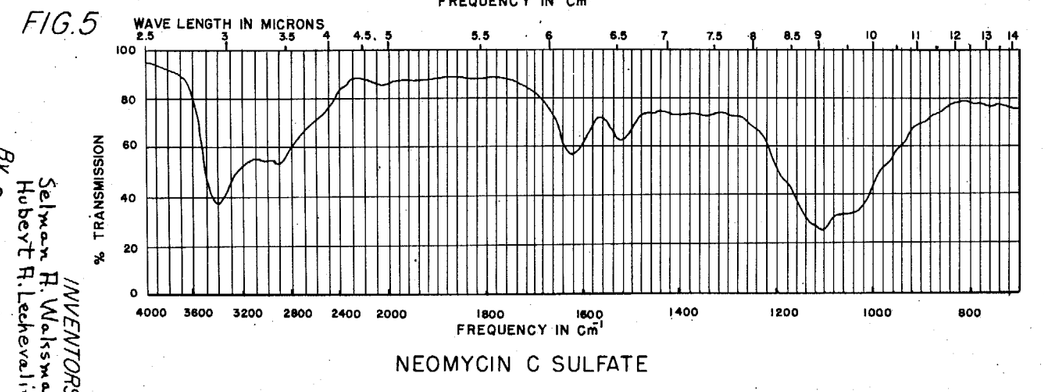
Fig. 5 is a curve of the infra-red spectrum of the sulfate of neomycin, specifically in the form of neomycin C sulfate.
Figure 6:
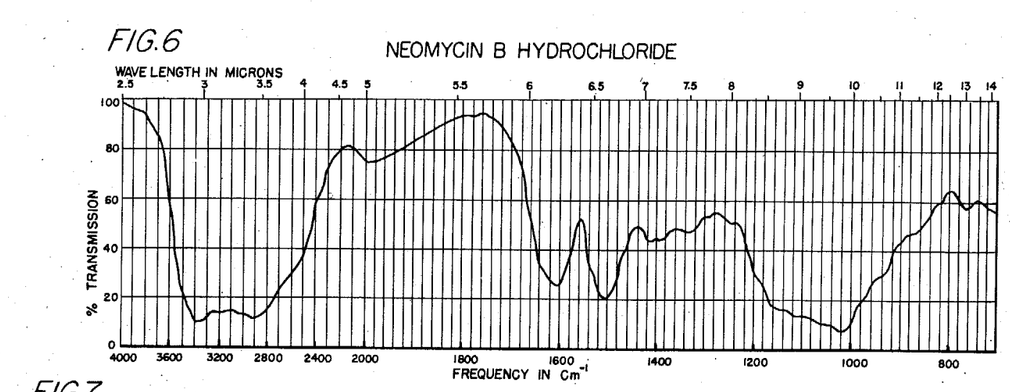
Fig. 6 is a curve of the infra-red spectrum of the hydrochloride of neomycin, specifically in the form of neomycin B hydrochloride.
Figure 7:
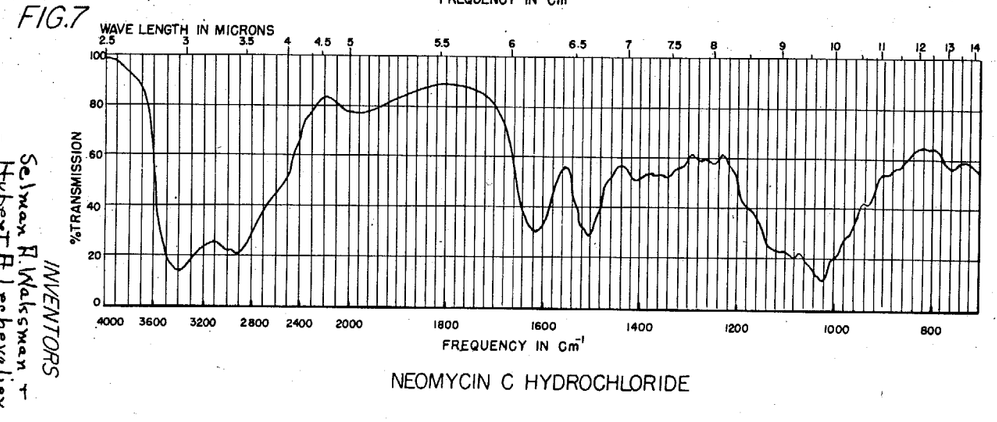
Fig. 7 is a curve of the infra-red spectrum of the hydrochloride of neomycin, specifically in the form of neomycin C hydrochloride.

Infra-red absorption spectra have been obtained with respect to neomycin, in various forms, and are illustrated in the drawings, Figs. 2 and 3 showing the spectrum of the free base respectively for the forms of neomycin B and neomycin C, Figs. 4 and 5 showing the spectra for neomycin B and neomycin C sulfates, and Figs. 6 and 7 showing the spectra for neomycin B and neomycin hydrochlorides. It will be noted at the outset that the spectra for neomycin B and neomycin C are very closely alike, indicating their near-identity and presenting what are believed to be a number of distinguishing characteristics (the same for both compounds) in relation to other substances.

These spectra were made with the respective compounds embodied in pressed potassium bromide disks, i. e. by taking mixtures of the particular neomycin compound in each case, with finely divided potassium bromide, the intimate, uniform admixture being compressed to a disk or tablet of appropriately transparent or translucent character for infra-red radiation. The spectra were taken in conventional fashion, with various points on the curves representing percent transmission and the curves being extended through a wide range of frequencies or wave lengths. The frequencies are conveniently stated in reciprocal centimeters (cm.$^{-1}$). Translation of the values to wave length in microns can be readily effected, if desired, in conventional manner.

It is noted that each of the spectra, i. e. for the free base, sulfate and hydrochloride of both neomycin B and neomycin C, exhibits broad intense absorption maximum bands at 3600 to 2400 cm.$^{-1}$ and 1200 to 900 cm.$^{-1}$. These bands appear to be distinctively characteristic of neomycin.

By way of preliminary chemical interpretation of the spectrum, it may be noted that in the case of the free base spectra, the strong broad absorption extending over the spectral range 3800 cm.$^{-1}$ to 2200 cm.$^{-1}$ indicates hydrogen bonded OH and NH groupings. Likewise in the free base spectra, absorption near 1590 cm.$^{-1}$ demonstrates at least a part of the nitrogen in the compound to be in primary amino grouping or groupings. A strong absorption in the vicinity of 1000 cm.$^{-1}$ confirms the presence of OH groupings in the structure.

In addition to the broad bands mentioned above, further details of significant features of the spectra are as follows, again expressed as approximate locations of maxima and minima at frequencies designated in reciprocal centimeters:

With respect to the spectra for the neomycin free base (Figs. 2 and 3) both neomycin B and neomycin C show intense absorption maxima at 2900, 1460 and 1015 cm.$^{-1}$, and absorption minima at 2890, 1525, 1425, 1210 and 800 cm.$^{-1}$. The neomycin B free base shows intense absorption maxima at 3380, 1583 and 1325 cm.$^{-1}$, and a distinct absorption maximum at 1378 cm.$^{-1}$. Neomycin C free base shows intense absorption maxima at 3340, 1590 and 1335 cm.$^{-1}$. In addition, it may be noted that the absorptions around 3150 cm.$^{-1}$ and around 1040 cm.$^{-1}$ are stronger for neomycin B than for neomycin C.

With respect to the spectra for neomycin sulfate (Figs. 4 and 5) both neomycin B and neomycin C show intense absorption maxima at 3400, 2910, 1625 and 1525 cm.$^{-1}$, and absorption minima at 2250, 1570 and 800 cm.$^{-1}$. Neomycin B sulfate shows intense absorption with a single maximum at 1110 cm.$^{-1}$, whereas neomycin C sulfate shows two absorption maxima respectively at 1120 and 1100 cm.$^{-1}$. Neomycin B sulfate also shows weak absorption maxima at 1463, 1408, 1381 and 1337 cm.$^{-1}$. It is also observed that neomycin B sulfate shows relatively stronger absorption near 3240 and 3105 cm.$^{-1}$, than neomycin C sulfate.

With respect to the spectra for neomycin hydrochloride (Figs. 6 and 7) both neomycin B and neomycin C show intense absorption maxima at 3400, 2900 and 1500 cm.$^{-1}$, and absorption minima at 1750, 1150, 1430 and 800 cm.$^{-1}$. Neomycin B hydrochloride shows intense absorption maxima at 1595 and 1010 cm.$^{-1}$ while neomycin C hydrochloride shows such maxima at 1603 and 1025 cm.$^{-1}$. In addition, neomycin B hydrochloride exhibits weak absorption maxima at 1381, 1325 and 812 cm.$^{-1}$, while neomycin C hydrochloride has a weak absorption maximum at 1343 cm.$^{-1}$. It also appears that neomycin B hydrochloride has relatively stronger absorption near 3220 cm.$^{-1}$ and in the vicinity of 2550 cm.$^{-1}$ than neomycin C hydrochloride.

As indicated above, purification of neomycin preparations may include chromatography, which may be utilized to effect a separation of neomycin C in purified form, relative to neomycin B. For example, upon subjecting neomycin which contains a major amount of B and a minor amount of C (e. g. produced as explained above), in appropriate acid salt form, to carbon chromatography, the major eluate fraction contains neomycin B, while a small fraction eluted prior to the main fraction removes neomycin C, which may thus be obtained in purified form and in quantity, from the collected preliminary fractions of a considerable number of carbon chromatograms. By way of example, a suitable column can be prepared, say to a bed depth of 42 inches, with an acidified aqueous slurry of 2 kilograms of activated carbon (Darco G-60) and one kilogram of diatomaceous earth. 400 grams of neomycin sulfate (containing both B and C) are prepared in an aqueous solution, 760 ml., at pH 2.5 (sulfuric acid), with the addition of some of the same materials as used in the column (total 300 g.) to form a slurry. The slurry is introduced into the top of the column and the column is developed with water, with the active fractions collected in 50 ml. cuts. After withdrawal of optically inactive liquid representing liquid holdup, the active material (in the further eluate fractions) is identified by optical rotation and represents first a small eluate containing neomycin C, and a main eluate from which neomycin B (sulfate) is recovered by suitable drying. The small neomycin C sulfate fractions recovered from a considerable number of carbon chromatograms as described above are combined and subjected to appropriate further purification, including carbon chromatography of exactly the same kind, yielding, from the optically significant and uniform fractions, a purified product of neomycin C sulfate (optical rotation, +82°).

It will be understood that where neomycin is produced in the form of a particular acid salt, the free base form may be obtained by suitable or conventional procedure, and other acid salts readily obtained from the free base. For instance, by treating the sulfate with a strongly basic anion exchange resin, the neomycin base is obtained. From the latter, other salts may be produced, for example, the hydrochloride being obtained by dissolving the base in dilute hydrochloric acid. These operations are equally applicable to neomycin in its B, C or mixed forms.

It will be understood that other procedures may be employed for the production of neomycin, and for its isolation and purification, for instance in accordance with variations of the sort indicated hereinabove, as well as in other ways consonant with the nature of the substance and its characteristics of solubility and of response to reagents appropriate for use in procedures of this general character. It is therefore to be understood that the invention is not limited to the specific steps and compositions herein described but may be embodied in other ways without departure from its spirit.

This application is a continuation-in-part of our copending application Serial No. 526,753, filed August 5, 1955, which was in turn a continuation-in-part of an application that was copending therewith, viz. Serial No. 131,686, filed December 7, 1949, now abandoned. Said last-mentioned application, Serial No. 131,686, was in turn a continuation-in-part of an application that was copending therewith, viz. Serial No. 76,184, filed February 12, 1949, now abandoned.

We claim:

1. In a process for producing the antibiotic substance neomycin, the steps of growing a culture of a neomycin-producing strain of *Streptomyces fradiae* in an aqueous medium favorable to such production and containing peptone material and a nutrient extract, to form said substance, said medium including a minor mineral content favorable to the production of neomycin, and separating the substance from the culture medium.

2. In a process for producing the antibiotic substance neomycin, the steps of growing a culture of a neomycin-producing strain of *Streptomyces fradiae* in an aqueous medium favorable to such production and containing peptone material, a nutrient extract, and a small amount of combined zinc, to form said substance, and separating the substance from the culture medium.

3. In a process for producing the antibiotic substance neomycin, the steps of forming said substance by growing a culture of a neomycin-producing strain of *Streptomyces fradiae* in an aqueous nutrient medium favorable to such production and containing a small amount of combined zinc, and separating the substance from the culture medium.

4. In a process for producing the antibiotic substance neomycin, the steps of forming said substance by growing a culture of a neomycin-producing strain of *Streptomyces fradiae* in an aqueous nutrient medium favorable to such production and containing glucose, said medium also including peptone material in sufficient amount to prevent the retardation of neomycin production which might otherwise be the effect of the glucose, said medium including a minor mineral content favorable to the production of neomycin, and separating the substance from the culture medium.

5. In a process for producing the antibiotic substance neomycin, the steps of forming the substance by growing a culture of a neomycin-producing strain of *Streptomyces fradiae* in an aqueous nutrient medium favorable to such production and containing glucose in amount greater than 5 grams per liter, said medium also including calcium carbonate to prevent the retardation of neomycin production which might otherwise be the effect of the glucose, the aqueous content of said medium being tap water, and separating the substance from the culture medium.

6. In a process for producing the antibiotic substance neomycin, the steps of forming the substance by growing a culture of a neomycin-producing strain of *Streptomyces fradiae* in an aqueous medium favorable to such production and containing peptone material, material of the class consisting of meat extract and yeast extract, and a small amount of combined zinc, and separating the substance from the culture medium.

7. In a process for producing the antibiotic substance neomycin, the steps of growing a culture of a neomycin-producing strain of *Streptomyces fradiae* in an aqueous nutrient medium favorable to such production and under submerged conditions with aeration, to form said substance, while controlling the extent of aeration to a limited value to provide an essentially maximum production for the aforesaid culture and conditions, said medium including a minor mineral content favorable to the production of neomycin, and separating the substance from the culture medium.

8. Procedure for recovering neomycin from a culture medium in which it has been produced, comprising reducing the pH of the neomycin-containing medium to a strongly acid value, treating the medium with an adsorbent to adsorb impurities therefrom, separating the treated medium from said adsorbent, adjusting the pH of said separated medium to a value at least as high as about 7, treating said adjusted medium with an adsorbent to adsorb neomycin therefrom, and eluting neomycin from said last-mentioned adsorbent.

9. In a process for producing the antibiotic substance neomycin by growing a culture of a neomycin-producing organism under conditions favorable to the formation of neomycin, the steps in separating the substance from the culture medium containing it, which comprise preliminarily purifying the medium by acidulating it to a pH of about 2, treating it with an adsorbent to adsorb impurities therefrom, and separating the treated medium from said adsorbent, and thereafter establishing the pH of the medium at a value at least as high as about 7, treating the medium with an adsorbent to adsorb the substance, and eluting the substance from the adsorbent with an aqueous solvent.

10. Procedure for recovering neomycin from a culture medium in which it has been produced, comprising acidulating the medium to a pH of about 2, treating it with active carbon to adsorb impurities therefrom, filtering the impurity-containing carbon from the medium, thereafter adjusting the pH of the medium to a value of about 7, treating the neomycin-containing medium with a cation-exchange adsorbent material to adsorb neomycin therefrom, and eluting neomycin from the adsorbent material.

11. In a process for producing the antibiotic substance neomycin, the steps of growing a culture of a neomycin-producing strain of *Streptomyces fradiae*, under submerged aerobic conditions, in an aqueous medium favorable to such production and containing nutrient material, to form said substance, said medium including a minor mineral content favorable to the production of neomycin, and separating the substance from the culture medium.

12. In a process for producing the antibiotic substance neomycin, the steps of growing a culture of a neomycin-producing strain of *Streptomyces fradiae* in an aqueous, nutrient-containing medium favorable to such production, having a pH greater than 6, and containing a source of nitrogen, to form said substance, said medium including a minor mineral content favorable to the production of neomycin, and separating the substance from the culture medium.

13. Procedure for recovering neomycin from a culture medium in which it has been produced, comprising acidulating the medium to a pH of about 2, treating it with active carbon to adsorb impurities therefrom, filtering the impurity-containing carbon from the medium, thereafter adjusting the pH of the medium to a value of about 7, treating the neomycin-containing medium with active carbon to adsorb neomycin therefrom, and eluting neomycin from the adsorbent material.

14. The method of producing neomycin comprising culturing a neomycin-producing strain of *Streptomyces fradiae*, adjusting the pH of the culture medium to about 2.0, filtering the acidified culture medium, neutralizing the filtrate, adding activated carbon to the neutralized filtrate to adsorb the antibiotic, and eluting the antibiotic from the charcoal with an acid solution.

15. The method of producing neomycin comprising culturing a neomycin-producing strain of *Streptomyces fardiae*, adjusting the pH of the culture medium to about 2.0, then treating the acidified culture medium with active carbon to adsorb impurities therefrom, filtering the acidified culture medium, neutralizing the filtrate, adding activated carbon to the neutralized filtrate to adsorb the antibiotic, and eluting the antibiotic from the second-mentioned carbon with an acid solution.

16. The method of producing neomycin comprising culturing a neomycin-producing strain of *Streptomyces fradiae*, adjusting the pH of the culture medium to about 2.0, filtering the acidified culture medium, neutralizing the filtrate, adding an adsorbent to the neutralized filtrate to adsorb neomycin therefrom, and eluting neomycin from said adsorbent.

17. The method of producing neomycin comprising culturing a neomycin-producing strain of *Streptomyces fradiae*, adjusting the pH of the culture medium to about 2.0, then treating the acidified culture medium with an adsorbent to adsorb impurities therefrom, filtering the acidified culture medium, neutralizing the filtrate, adding an adsorbent to the neutralized filtrate to adsorb neomycin therefrom, and eluting neomycin from said last-mentioned adsorbent.

18. An organic antibiotic composition selected from the group consisting of neomycin B, neomycin C and the acid salts of said neomycins, each of said neomycins being a substance: which is thermostable, soluble in water, dilute hydrochloric acid and acid-alcohol of low acid normality, insoluble in ether, chloroform and acetone, essentially non-toxic to animals in amounts effective to control infection, stable in aqueous solution for at least one month, and incapable of inactivation by hydroxylamine; and which is characterized by: negative reaction to test for guanidine; failure to give the maltol reaction; negative responses to the biuret reaction test and to test for glucosamine; positive responses to the ninhydrin test and to tests for carbohydrate residues; absence of acidic, carbonyl and methoxyl groups; production, on methanolysis, of neamine and neobiosaminide; containing the following elements in the following approximate proportions, C. 44.95%, H 7.55%, N 14.46%, O 33.04%; substantial antibiotic activity against     B. subtilis
    B. mycoides
    B. cereus
    S. marcescens
    Bodenheimer's organism and against both streptomycin-sensitive and streptomycin-resistant strains of     E. coli
    S. aureus
    M. tuberculosis
    M. avium and relative inactivity against fungi and *Rickettsia rickettsii*; further properties of said neomycins being that: neomycin B hydrochloride and neomycin C hydrochloride exhibit optical rotation, in water, of +54° and +80° respectively; and said neomycins have characteristic infrared absorption, observed with the substances in pressed potassium bromide disks, and measured in frequencies of the infra-red region expressed in reciprocal centimeters, as follows: both of said neomycins in free base form and their hydrochlorides exhibit broad intense absorption maximum bands at 3600 to 2400 cm.$^{-1}$ and 1200 to 900 cm.$^{-1}$; each of said neomycins in free base form shows intense absorption maxima at 2900, 1460 and 1015 cm.$^{-1}$, and absorption minima at 2980, 1525, 1425, 1210 and 800 cm.$^{-1}$; neomycin B hydrochloride and neomycin C hydrochloride each have intense absorption maxima at 3400, 2900 and 1500 cm.$^{-1}$, and absorption minima at 1750, 1550, 1430 and 800 cm.$^{-1}$; neomycin B in free base form has intense absorption maxima at 3380, 1583 and 1325 cm.$^{-1}$ and a distinct absorption maximum at 1378 cm.$^{-1}$; neomycin C in free base form has intense absorption maxima at 3340, 1590 and 1335 cm.$^{-1}$; neomycin B hydrochloride has intense absorption maxima at 1595 and 1010 cm.$^{-1}$ and weak absorption maxima at 1381, 1325 and 812 cm.$^{-1}$; and neomycin C hydrochloride has intense absorption maxima at 1603 and 1025 cm.$^{-1}$ and a weak absorption maximum at 1343 cm.$^{-1}$.

19. Neomycin B free base, as defined in claim 18.
20. An acid salt of neomycin B, as defined in claim 18.
21. Neomycin B hydrochloride, as defined in claim 18.
22. Neomycin B formate, as defined in claim 18.
23. A method of producing neomycin in high yields without the use of added buffering agent, which comprises culturing *Streptomyces fradiae* in contact with an aqueous nutrient medium essentially comprising an assimilable source of nitrogenous and growth-promoting substances and an assimilable carbohydrate component, a substantial proportion of said carbohydrate component being maltose.

No references cited.

U. S. DEPARTMENT OF COMMERCE
PATENT OFFICE
CERTIFICATE OF CORRECTION

Patent No. 2,799,620                           July 16, 1957

Selma A. Waksman et al.

It is hereby certified that error appears in the printed specification of the above numbered patent requiring correction and that the said Letters Patent should read as corrected below.

Column 1, line 44, for "resistant of" read -- resistant to --; column 14, line 60, after "neomycin", second occurrence, insert -- C --; column 15, line 30, for "2890" read -- 2980 --; line 53, for "1150" read -- 1550 --.

Signed and sealed this 8th day of April 1958.

(SEAL)

Attest:

KARL H. AXLINE
Attesting Officer

ROBERT C. WATSON
Commissioner of Patents